United States Patent
Kupfer et al.

(10) Patent No.: US 7,278,235 B2
(45) Date of Patent: Oct. 9, 2007

(54) LIQUID GRAVITY FEED ANT ELIMINATION DEVICE

(75) Inventors: Kenneth Jay Kupfer, Nokomis, FL (US); Robert E. McManus, Nokomis, FL (US)

(73) Assignee: KM Investors, LLC, Nokomis, FL (US)

(*) Notice: Subject to any disclaimer, the term of this patent is extended or adjusted under 35 U.S.C. 154(b) by 0 days.

(21) Appl. No.: 11/241,194

(22) Filed: Sep. 30, 2005

(65) Prior Publication Data

US 2006/0080889 A1    Apr. 20, 2006

Related U.S. Application Data

(60) Provisional application No. 60/620,002, filed on Oct. 19, 2004.

(51) Int. Cl.
*A01M 1/20* (2006.01)

(52) U.S. Cl. .................................... 43/131; 43/132.1

(58) Field of Classification Search ................ 43/131, 43/132.1; 222/185.1, 518
See application file for complete search history.

(56) References Cited

U.S. PATENT DOCUMENTS

| | | | |
|---|---|---|---|
| 1,139,030 | A | 5/1915 | Goldhammer |
| 1,994,859 | A | 3/1935 | Langum |
| 2,725,665 | A | 12/1955 | Mullen et al. |
| 2,750,707 | A | 6/1956 | Ekstedt |
| 3,122,857 | A | 3/1964 | Yates |
| 4,662,103 | A | 5/1987 | Cheng |
| 4,840,143 | A | 6/1989 | Simon |
| 5,501,033 | A | 3/1996 | Wefler |
| 5,667,816 | A | 9/1997 | Moss |
| 5,746,021 | A | 5/1998 | Green |
| 5,839,221 | A | 11/1998 | Ron et al. |
| 5,943,816 | A | 8/1999 | Hyatt et al. |
| 6,220,525 | B1 | 4/2001 | McSherdon |
| 6,223,465 | B1 | 5/2001 | Soller et al. |

*Primary Examiner*—Kimberly S. Smith
(74) *Attorney, Agent, or Firm*—Gifford, Krass, Sprinkle, Anderson & Citkowski, P.C.

(57) ABSTRACT

An insect attractant and elimination device comprising a base, reservoir and shield, each of which cooperates to house, protect and provide a liquid bait which is dispensed from the reservoir to the base in a selected quantity for the consumption by targeted insect groups. The reservoir is made cooperable with the base by an adapter which may be easily removed from each thereof so as to facilitate replenishment of the bait supply and otherwise servicing the device, and to permit use of third party containers, with or without bait included, and containers of varying capacity and shields and bases of different configurations accommodating differing insect control applications.

14 Claims, 2 Drawing Sheets

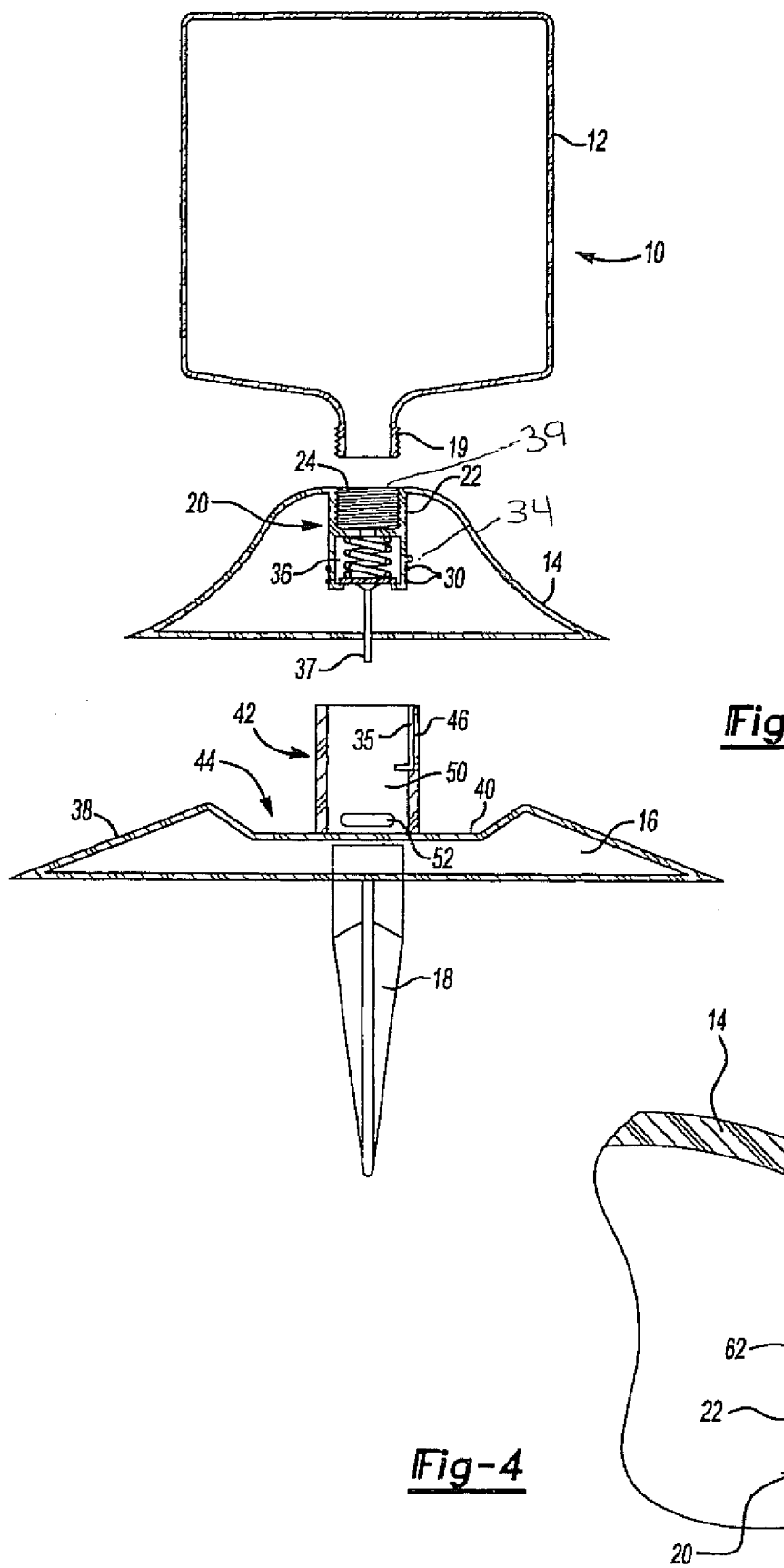

LIQUID GRAVITY FEED ANT ELIMINATION DEVICE

RELATED APPLICATION

This application claims priority of U.S. Provisional Patent Application Ser. No. 60/620,002 filed Oct. 19, 2004, which is incorporated herein by reference.

FIELD OF THE INVENTION

This invention relates to the field of pest control, and moreover, to an insect attractant and elimination device that is constructed to accept containers of various sizes of insect bait to be fed to such insects, and to facilitate the servicing of the device.

BACKGROUND OF THE INVENTION

Applicants of the instant application have previously spoken to a form of the device mentioned above and, in doing so, have noted the prior art and bait formulation either used therewith or separately, such discussion being detailed in U.S. Pat. No. 6,467,216 B2, issued Oct. 22, 2002, the entire content of which is now incorporated herein by reference.

It is desirable, however, particularly in agriculture, to provide a device that permits and facilitates its user to mount and un-mount the bait container and weather shield from the base stabilizing platform by a push and twist to mount and thereby open the bait communication between the bait reservoir and the middle ring of the base where the insects feed, and a twist and pull to un-mount the bait container and weather shield from the stabilizing base thus interrupting the above described bait communications, and permitting the internal cleaning of the device.

In addition, it is desirable to provide a device that permits its user to utilize the containers of the bait in the form of bottles or the like to provide a supply of the bait for the device to be used to attract and eliminate insects such as ants. By being able to use the container it is then not necessary to provide a housing for containing the bait as a part of the device and it eliminates the step of pouring the contents of the purchased bait from the original container to the container of the device, and permits use of containers of different size and bait capacity for varying insect control applications.

SUMMARY OF THE INVENTION

As demonstrated by the aforementioned patent, Applicants have invented a Liquid Gravity Feed Elimination System (hereinafter "LGFAES") in an effort to assist users in the task of attracting and then eliminating insects such as ants. With this instant application, however, Applicants address the desirability of providing a LGFAES device that increases the effectiveness and reduces the time to replenish the bait supply and to clean the LGFAES, particularly in agriculture applications.

In addition, with this instant application, Applicants have also addressed the desirability of providing a LGFAES device which is reduced in cost and which increases the flexibility in use because one of the elements of the previous construction has been eliminated and which permits delivery of bait in different sized containers supplied by different bait manufacturers.

The LGFAES device of the present invention comprises means for accommodating a reservoir for containing a liquid bait, a shield for protecting bait dispensed from the reservoir, a base and a stabilizing device, all of which function in substantially the same manner as in Applicants' predecessor design. Unlike that design, however, it is intended that the reservoir to be used as part of the LGFAES device be a commercially available bottle purchased with or without the bait rather than a housing provided as part of the device.

To permit the user to position the container in place on the LGFAES device, an adapter is provided which is separable from the base and from the reservoir to provide a support for mounting the bait container to the base. In a preferred construction, at the first of its ends, the adapter enables a mating with the base by means of multiple plastic o-rings attached to the outer wall of the adapter that cooperate with the inner wall of the center ring of the base to provide a seal to prevent air or liquid migration. The outer wall of the adapter above the o-rings cooperates with the inner wall of the center ring of the base to form a bayonet-type joint to permit the adapter-shield-reservoir assembly to firmly lock into the base.

A spring-loaded check valve in the adapter cooperates with the center ring of the base to open the valve and permit communication of the bait between the reservoir and the middle ring of the base and the feeding insects when the adapter is inserted into the center ring of the base and the bayonet-type connection is in a locked position. Such communication of bait is conversely interrupted when the adapter-shield-reservoir assembly is unlocked and raised off of the center ring of the base.

At the second of its other ends the adapter enables a mating and threaded connection with the bait container and the adapter cooperating with the shield which flares outwardly and downwardly from the remainder thereof, and additionally, provides an engagement surface against which the opening of the bait container abuts. Thus, the adapter cooperating with the shield accomplishes weather sheltering over the base and the insect feeding area and a structural support upon which the container is seated. Second, once assembled as described, the adapter provides a conduit through which liquid bait is communicated from the container to the base.

The provision of the adapter noted above provides a LGFAES device that facilitates replenishment of the bait supply and otherwise servicing the LGFAES, particularly, in agriculture applications, and permits use of third party containers, with or without bait included, and of varying capacity accommodating differing insect control applications.

BRIEF DESCRIPTION OF THE DRAWINGS

A clearer understanding of the present invention can be had upon reference to the following drawings in which:

FIG. 2 illustrates a an exploded and cross sectional view of the invention according to FIG. 1;

FIG. 4 is a fragmentary cross sectional view illustrating a preferred modification of the connection between the adapter and the shield of the present invention.

DESCRIPTION OF THE PREFERRED EMBODIMENT

Figure 1:
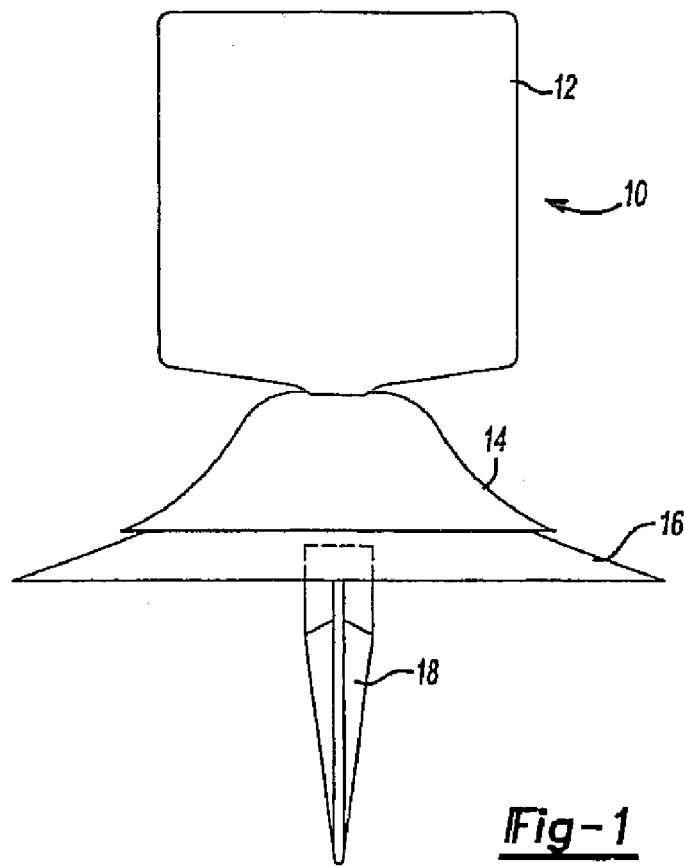
FIG. 1 illustrates a side view of an assembled liquid gravity feed ant elimination system according to the present invention.

Looking to FIG. 1, there is provided a Liquid Gravity Feed Ant Elimination System (LGFAES) 10 for the attraction and elimination of insect pests, such as ants. As its name comprehends, the LGFAES device uses a liquid low-toxicity bait to lure targeted ants which, it is intended, will return to their colonies to distribute such bait there among to destroy the colony.

FIG. 1 illustrates the LGFAES device 10 in its assembled form in which a liquid bait containing reservoir 12 with cooperating shield 14 is provided above base 16. The base 16 is available for engagement with the ground or other surface. When intended for use on the ground, the base 16 may be fitted with a stabilizing device, preferably in the form of a stake 18, which is to be inserted in the ground so as to assure proper positioning of the LGFAES device 10.

Referring to FIG. 2, the assembly of the LGFAES device 10 is shown with more particularity whereby the relationship of the reservoir 12 to the base 16 may be more easily understood. As may be seen therein, the reservoir 12 is in the form of a bottle or the like which could be the original container for the liquid bait that is being used in the LGFAES device 10.

Figure 3:
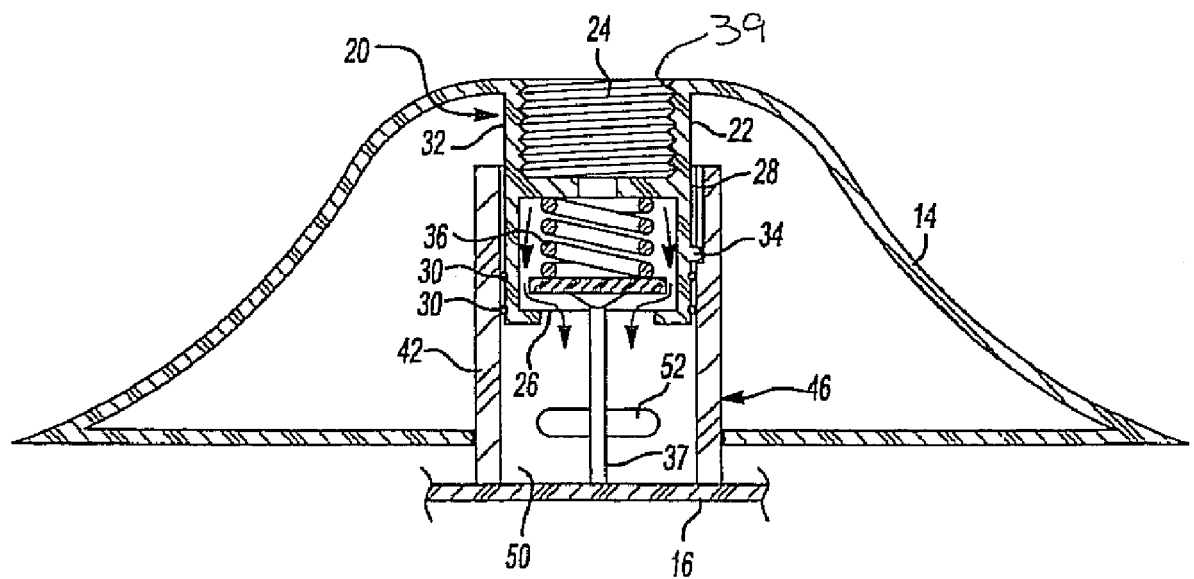
FIG. 3 illustrates an enlarged view of the adapter shown in FIG. 2.

As can best be seen in FIG. 3 an adapter 20 which is integral with the shield 14 but which is independent of the reservoir 12 and the base 16, and which is preferably is in the form of a hollowed stem 22 receives a neck 19 of the reservoir 12. The stem 22 comprises first and second open ends 24 and 26, respectively, and a mid-portion 28. Multiple o-rings 30 are formed on the exterior surface 32 of the mid-portion 28 and an integral part of stem 22 to matingly engage, and therefore mount and form a seal with an interior 50 of a sleeve 46 of the center ring 42 of the base 16.

Still referring to FIG. 3 above the o-rings 30 on an exterior surface 32, a bayonet type connection is provided between the stem 22 and the sleeve 46. The connection is formed by providing a pin 34 formed as an integral part of the stem 22 to matingly engage, and therefore lock with a cooperating L shaped slot 35 (FIG. 2) formed on the interior 50 of the sleeve 46 of the center ring 42 of the base 16.

A spring check valve 36 inserted into above the open end 26 of the stem 22 is normally closed and operates to open when the stem 22 is inserted into position within the sleeve 46 and an actuator 37 for the valve 36 engages the center ring 42 of the base 16, thusly permitting the flow of bait from reservoir 12 to the middle ring 40 of the base 16. When the stem 22 is disengaged from the base 16, the bait communication is interrupted.

While the shield 14 and the stem 22 have been shown as integrally formed in FIGS. 2 and 3 it should be understood that if preferred they could be separately formed as shown in FIG. 4 with exterior threads 60 formed on the upper end 24 of the stem 22 and interior threads 62 formed on the shield 14 such that the shield 14 would be threadingly engaged and supported by the stem 22.

Referring again to FIG. 3 interior threads 39 in the upper end 24 of the stem 22 are provided to mate with the exterior threaded neck 19 of the reservoir 12 such that the reservoir 12 is threadingly engaged with and supported by the stem 22 and the shield 14. The shield 14 cooperating with the adapter 20 provides a means of accommodating bottles of a varying sizes and configurations.

As can best be seen in FIG. 2 the base 16 comprises an outer ring 38, a middle ring 40 and the center ring 42, each of which is successively adjacent to another thereof to provide a platform upon which the liquid bait is placed for consumption by the insects. The middle ring 40 provides a trough 44 for receipt and retention of bait which is fed by gravity from the reservoir 12. The center ring 42 includes the sleeve 46 with the interior 50 to receive the o-rings 30 and the bayonet type joint pin 34 for matingly engaging with and supporting the assembled form of the adapter 20, the shield 14 and the reservoir 12. The center ring 42 further comprises at least one aperture, e.g., a horizontal slit 52, for the dispensation of the liquid bait from the reservoir 12 to the trough 44 of middle ring 40 of base 16.

FIG. 3 is an enlarged view of the adapter 20 described in FIG. 2 and shown as being integral with the shield 14 but independent of the reservoir 12 and the base 16. As indicated above the adapter could be independent of the shield 14 as well. Shown are the stem 22 with its first and second open ends 24 and 26, respectively, and the mid-portion 28; the multiple o-rings 30 formed on the exterior surface 32 of the mid-portion 28 as an integral part of the stem; and the spring check valve 36 inserted above the open end 36 of the stem 22.

It should be clear that a device has been disclosed which will accommodate bottles of different configurations to be used as the reservoir of the device. It is not necessary then to pour the bait to be used with the device from a bottle that has been purchased containing the bait to a reservoir for the device. The bottle can simply be opened and with the bottle upright the neck of the bottle can be screwed into the adapter of the device. The valve will be urged by the spring to the closed position so that the bottle can be replaced without spilling the bait.

Further if desired the entire shield, adapter and reservoir can be removed from the base of the device by utilizing the bayonet connection between the adapter and the base 16. This is especially useful in agricultural applications by permitting empty reservoirs in the field to be replaced by filled reservoirs on a regular basis. The empty reservoirs can be easily separated from the base and taken back to a common filling facility. Filled reservoirs can replace the empty reservoirs quickly and easily with a simple push and turn motion.

It should also be understood that although a preferred construction of the adapter of the present invention has been disclosed, changes can be made without departing from the spirit of the invention. It is only necessary that an adapter be provided that will accommodate containers such as bottles, shields and bases of various sizes and configurations, and with varying means mounting.

The adapter is intended to accommodate standard size bottles, but it should also be understood that to increase the versatility of the LGFAES device of the present invention several adapters of different sizes could be provided with each device so that the device could accommodate a wider range of bottle and shield sizes and configurations.

Although the device has been described with reference to the elimination of ants, the device could be used for the elimination of other insects that can be attracted to the LGFAES device to consume a low toxicity chemical, insect growth regulator, mating disruption pheromone, BT protein, virus or any other such biorational concoction.

While the foregoing example describes a certain preferred embodiment, it is to be recognized that one of ordinary skill in the art could adopt other forms; accordingly, the scope of the invention is to be limited only by the following claims.

The invention claimed is:

1. A device for eliminating ants and other insect pests comprising:
   a reservoir for containing bait, said reservoir being in the form of a bottle;
   a base having an outer ring, a middle ring, and a center ring;
   an adapter and a means for mounting said adapter to said center ring;
   said adapter removably operable with said reservoir and said base and which is selectively engageable with each thereof, said adapter being hollow therethrough and comprising a passageway for said bait between said reservoir and said base upon such engagement;
   a shield removably operable with said adapter for protecting bait dispensed therefrom, said shield extending therefrom;
   said shield having means for mounting said shield to said adapter;
   means for said adapter to selectively close said passageway for said bait between said reservoir and said base; and
   a connecting portion formed on said adapter to accommodate reservoirs of various configurations.

2. The device as recited in claim 1 wherein:
   said mounting means comprises a plurality of o-rings and a bayonet-type connector attached to an outer wall of said adapter and matingly engageable with said center ring of said base.

3. The device as recited in claim 1, further comprising:
   means for mounting said adapter to said reservoir.

4. The device as recited in claim 3 wherein:
   said mounting means for mounting said adaptor to said reservoir comprises matingly engageable threads provided on said adapter and said reservoir.

5. The device as recited in claim 1 wherein:
   said base comprises at least one opening which receives bait which is to be passed from said reservoir thereto.

6. The device as recited in claim 1 wherein:
   said adapter comprises an opening which receives bait which is to be passed from said reservoir to said base.

7. The device as recited in claim 6 wherein:
   said adapter comprises a member available for engagement with said base to selectively regulate the passage of bait from said reservoir to said base.

8. The device as recited in claim 1, further comprising:
   a stake attached to said base.

9. A device for the attraction and elimination of ants and other insect pests comprising:
   a reservoir for containing a liquid bait, said reservoir having a neck portion;
   a base having an outer ring, a middle ring and a center ring;
   an adapter separately interposed between said reservoir and said base for mounting said neck of said reservoir to said center ring of said base;
   a shield having means for mounting said shield with said adapter and extending outwardly therefrom;
   said adapter being formed to accommodate said neck portion of said reservoir of various capacities;
   means for mounting said center ring to said adapter to position said shield adjacent said middle ring of said base to shield the contents thereof;
   said center ring and said adapter comprising openings providing fluid communication between the interior of said reservoir and said middle ring to permit the liquid bait to be passed from said reservoir to said middle ring; and
   means for selectively closing such fluid communication between said reservoir and said middle ring.

10. The device as recited in claim 9, further comprising:
    a stake attached to said base.

11. The device, as recited in claim 9, wherein:
    said shield extends outwardly and downwardly from said adapter to a position overlying said middle ring to protect the bait passed to at least one of said center and middle rings.

12. The device as recited in claim 9 wherein:
    said means for mounting said shield with said adapter allows the distance between said shield and said base to be varied.

13. The device recited in claim 9 wherein:
    said means for mounting said shield with said adaptor comprises a threaded connection between said shield and said adapter.

14. The device as recited in claim 9 and including:
    a spring actuated valve mounted within said adapter to open and close fluid communication between said reservoir and said middle ring.

* * * * *